United States Patent
Lee et al.

(10) Patent No.: US 11,816,852 B2
(45) Date of Patent: *Nov. 14, 2023

(54) ASSOCIATING LIDAR DATA AND IMAGE DATA

(71) Applicant: Zoox, Inc., Foster City, CA (US)

(72) Inventors: Tencia Lee, San Francisco, CA (US); Sabeek Mani Pradhan, Redwood City, CA (US); Dragomir Dimitrov Anguelov, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/940,216

(22) Filed: Jul. 27, 2020

(65) Prior Publication Data
US 2021/0104056 A1 Apr. 8, 2021

Related U.S. Application Data

(63) Continuation of application No. 15/970,838, filed on May 3, 2018, now Pat. No. 10,726,567.

(51) Int. Cl.
*G06T 7/521* (2017.01)
*G06T 7/11* (2017.01)
(Continued)

(52) U.S. Cl.
CPC ............ *G06T 7/521* (2017.01); *G01S 17/931* (2020.01); *G05D 1/024* (2013.01); *G05D 1/0212* (2013.01);
(Continued)

(58) Field of Classification Search
CPC ... G06T 7/521; G06T 7/11; G06T 7/77; G06T 2207/20081; G06T 2207/30261;
(Continued)

(56) References Cited

U.S. PATENT DOCUMENTS 9,369,689 B1 * 6/2016 Tran .................... H04N 13/239
9,872,010 B2 1/2018 Tran et al.
(Continued)

FOREIGN PATENT DOCUMENTS

CN 102663722 A 9/2012
CN 103745441 A 4/2014
(Continued)

OTHER PUBLICATIONS

Depth Video Enhancement, Min et al, 2011 (Year: 2011).*
(Continued)

*Primary Examiner* — Jianxun Yang
(74) *Attorney, Agent, or Firm* — Lee & Hayes, P.C.

(57) ABSTRACT

A monocular image often does not contain enough information to determine, with certainty, the depth of an object in a scene reflected in the image. Combining image data and LIDAR data may enable determining a depth estimate of the object relative to the camera. Specifically, LIDAR points corresponding to a region of interest ("ROI") in the image that corresponds to the object may be combined with the image data. These LIDAR points may be scored according to a monocular image model and/or a factor based on a distance between projections of the LIDAR points into the ROI and a center of the region of interest may improve the accuracy of the depth estimate. Using these scores as weights in a weighted median of the LIDAR points may improve the accuracy of the depth estimate, for example, by discerning between a detected object and an occluding object and/or background.

20 Claims, 8 Drawing Sheets

(51) Int. Cl.
   *G06T 7/77* (2017.01)
   *G06N 20/00* (2019.01)
   *G05D 1/02* (2020.01)
   *G01S 17/931* (2020.01)

(52) U.S. Cl.
   CPC .............. *G06N 20/00* (2019.01); *G06T 7/11* (2017.01); *G06T 7/77* (2017.01); *G06T 2207/20081* (2013.01); *G06T 2207/30261* (2013.01)

(58) Field of Classification Search
   CPC . G06T 2207/10028; G06T 2207/20076; G01S 17/931; G05D 1/0212; G05D 1/024; G06N 20/00
   See application file for complete search history.

(56) References Cited

U.S. PATENT DOCUMENTS

| | | |
|---|---|---|
| 2007/0192035 A1 | 8/2007 | Schweitzer et al. |
| 2010/0235129 A1* | 9/2010 | Sharma .................. G01S 17/86 702/97 |
| 2010/0328644 A1 | 12/2010 | Lu et al. |
| 2015/0015569 A1* | 1/2015 | Jung ..................... G06T 3/4053 345/419 |
| 2019/0004535 A1* | 1/2019 | Huang ..................... G06T 5/50 |
| 2019/0228504 A1* | 7/2019 | Tong ........................ G01S 17/86 |
| 2019/0340775 A1 | 11/2019 | Lee et al. |

FOREIGN PATENT DOCUMENTS

| | | |
|---|---|---|
| CN | 104866864 A | 8/2015 |
| CN | 104933392 A | 9/2015 |
| CN | 106375674 A | 2/2017 |
| CN | 106796656 A | 5/2017 |
| CN | 107836012 A | 3/2018 |
| CN | 107925727 A | 4/2018 |
| JP | 2016189184 A | 11/2016 |
| WO | WO2018126228 | 7/2018 |

OTHER PUBLICATIONS

Kwak et al, "Extrinsic Calibration of a Single Line Scanning Lidar and a Camera", Intelligent Robots and Systems (IROS), 2011 IEEE/RSJ International Conference on IEE, Sep. 25, 2011, pp. 3283-3289.

Min, et al., "Depth Video Enhancement Based on Weighted Mode Filtering", IEEE Transactions on Image Processing, vol. 21, No. 3, Mar. 2012, pp. 1176-1190.

Office Action for U.S. Appl. No. 15/970,838, dated Oct. 22, 2019, Lee, "Associating LIDAR Data and Image Data", 17 pages.

PCT Search Report and Written Opinion dated Sep. 5, 2019 for PCT Application No. PCT/US2019/028819, 15 pages.

Chinese Office Action dated Apr. 17, 2023 for Chinese patent application No. 2019800422009.5, a foreign counterpart of U.S. Pat. No. 10,726,567, 12 pages.

Japanese Office Action dated Mar. 7, 2023 for Japanese patent application No. 2020-561676, a foreign counterpart of U.S. Pat. No. 10,726,567, 13 pages.

* cited by examiner

ASSOCIATING LIDAR DATA AND IMAGE DATA

RELATED APPLICATIONS

This application claims priority to U.S. patent application Ser. No. 15/970,838, filed May 3, 2018, which is incorporated herein in its entirety.

BACKGROUND

Camera images traditionally include two-dimensions of data. Therefore, even when object detection is conducted on an image of a scene, this detection provides no more than the coordinates of the image that correspond to the detected object (i.e. depth and/or scale is ambiguous). Solutions, such as using stereo cameras, have been introduced to recover the depth of a detected object from an image. However, stereo camera depth detection is error-prone and is often too slow for real-time applications, such as autonomous vehicle control, which could lead to reduced safety outcomes.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1A:
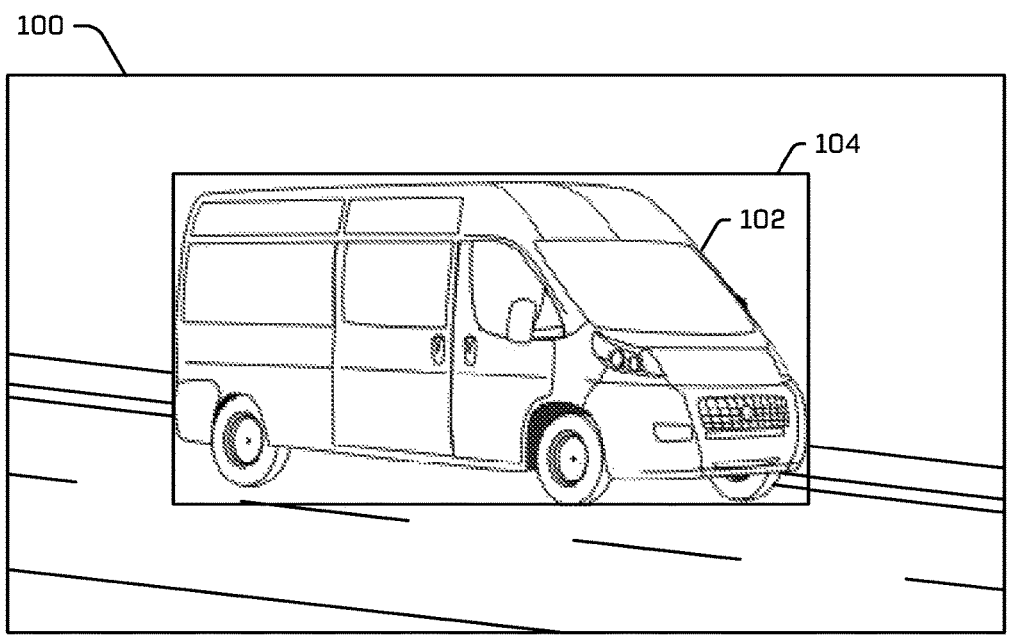
FIG. 1A illustrates an example image that includes a detected object and bounding box generated to identify the location of the detected object in the image.

The techniques (e.g., machine and/or process) discussed herein may include determining a distance to an object in an environment using image data from an image sensor and LIDAR data from a LIDAR sensor. In some examples, the techniques discussed herein determine the distance from the camera to the object (e.g., a depth of the object) based at least in part on receiving an indication of pixels that correspond to the object in the image (termed a "region of interest" herein); receiving LIDAR data; and determining LIDAR points from the LIDAR data that correspond to the region of interest and a time the image was taken. Once these LIDAR points have been identified, the techniques may include scoring the LIDAR points and using the scores associated with the LIDAR points as weights in a weighted median calculation, sorting the LIDAR points by distance (e.g., each LIDAR point may be associated with a distance measurement and, in some examples, an angle as well), and determining a weighted median of the sorted LIDAR points using the scores as the weights. In some examples, the techniques may include identifying the weighted median as a depth estimate to associate with the object. Such techniques may provide for more accurate depth estimates of objects by accounting for LIDAR data of occluding objects.

The images discussed herein may be monocular images capturing a two-dimensional representation of an environment. That is, the monocular images may include color/greyscale image data (including, but not limited to, visible camera data, infrared camera data, and the like), but lack a depth (e.g., a "z-axis" in a Euclidian coordinate system). The techniques discussed herein may include determining a depth of an object detected in the image. In other words, the techniques discussed herein identify how far away from where the image was taken (e.g., the camera, the focal plane, the image plane—although the discussion herein simplifies this by just referring to the "camera," even though the image plane may be at a slightly different position than the camera because of lens characteristics) the detected object lies. In some examples, a LIDAR sensor may measure the distance from the LIDAR sensor to multiple surface points within a scene. For each surface point, the LIDAR sensor may determine both the distance of the surface point and its angular direction with respect to the LIDAR sensor. This capability may be used to create a point cloud including three-dimensional coordinates of the multiple surface points. In some examples, LIDAR sensors are configured to rotate in 360 degrees to create a point cloud (e.g., a plurality of LIDAR points) of an environment surrounding the LIDAR device that is within a field-of-view ("FOV") of the LIDAR sensor, though any other type of LIDAR sensor is contemplated (e.g. solid-state, MEMS, flash, etc.). When multiple LIDAR devices are used simultaneously, all LIDAR data collected over a period of time (such as a single spin for spinning LIDAR devices) is referred to herein as a "metaspin."

In some examples, the techniques may include capturing an image of an environment by a camera and creating a point cloud of the environment using a LIDAR sensor. The techniques may include detecting an object in the image and/or determining a region of interest (ROI) associated with the detected object (e.g., a mask comprised of pixels corresponding to the detected object, a bounding box that encompasses pixels identified as being associated with the detected object, and the like). For example, the ROI may correspond with a visible surface of the detected object, although the distance from the camera to the visible surface of the detected object (the "depth") may be unknown, if only a monocular image is available.

In some examples, the techniques may include identifying a portion of LIDAR data that corresponds to the portion of the environment captured in the image by the camera and/or that corresponds to the ROI of the image, which may be a smaller subset of the image. The techniques may additionally or alternatively include determining LIDAR data that most closely corresponds to a time at which the image was captured. In some examples, the camera and the LIDAR sensor may be phase-locked so that the camera and the LIDAR sensor capture data corresponding to a same region of the environment at the same time, but, in some examples, the camera and the LIDAR sensor may capture data corresponding to the same region at slightly different times. In the latter example, the techniques may include determining LIDAR data that was captured at a time that most closely corresponds to a time that the image was captured. For example, if a camera captures images of the region of the environment at 30 Hz and the LIDAR sensor captures LIDAR data of the region at 10 Hz, the techniques may include determining, for every three metaspins of the LIDAR sensor, which metaspin of the three includes a subset of data that corresponds most closely to the image in time (and corresponds to the ROI, as mentioned above). Similarly, in some examples, multiple images may be chosen representative of the time a metaspin was collected and a subset of the images may be selected as the images most representative of the environment as the metaspin was collected.

Unless discussed otherwise, the term "LIDAR points" refers to the subset of the LIDAR data taken in a metaspin that corresponds most closely to the ROI in space (where the ROI corresponds to in the environment and/or image) and/or time.

In some examples, once the LIDAR points have been identified that correspond to the ROI and/or the time, as discussed above, the techniques may further include scoring these LIDAR points, sorting the LIDAR points by distance (e.g., each LIDAR point is associated with a depth measurement that includes at least a distance from the LIDAR sensor and an angle and the sorting may include organizing these from smallest distance to greatest distance or vice versa), and identifying a LIDAR point associated with a weighted median of the sorted LIDAR points. In some examples, the scores of the LIDAR points may be used as the weights to find the weighted median. In some examples, the techniques may include identifying, as a primary depth estimate, a depth measurement associated with the LIDAR point that is the weighted median.

However, in some scenarios, a second object may occlude at least part of the detected object in the image. In some cases, the second object may be positioned such that the primary depth estimate corresponds, in reality, to the second object, which may be an occluding object if it appears in front of at least a portion of the detected object. To account for this, the techniques may include removing a group of the LIDAR points that correspond to distances within a range of the primary depth estimate. For example, any LIDAR points associated with depth measurements that lie between 0.8 meters in front of the primary depth estimate (i.e., towards the LIDAR sensor) and 1.6 meters behind the primary depth estimate (i.e., on the other side of the primary depth estimate from the LIDAR sensor) may be excluded. The techniques may include identifying the subset of LIDAR points associated with depth measurements that lie outside of this range, sorting the subset of LIDAR points, identifying a weighted median of the subset of LIDAR points, and identifying the weighted median of the subset as a secondary depth estimate.

To distinguish between the primary depth estimate and the secondary depth estimate as truly being associated with the detected object and not an occluding object, the techniques may include determining a difference between the primary depth estimate and the secondary depth estimate such as, for example, a distance between the two estimates. The techniques may compare this to a threshold difference that may be statically defined (e.g., 1.5 meters, 3 meters) or that may be associated with a classification of the detected object (e.g., 6 meters for semi-trucks, 3 meters for pickup trucks, 2 meters for passenger vehicles, 1 meter for compact vehicles).

If the difference is less than or equal to the threshold difference (e.g., the difference between the two estimates is 1 meter and the detected object is a passenger vehicle associated with a threshold difference of 2 meters), the techniques may identify the estimates as both corresponding to the detected object. In some examples, the techniques may output the primary depth estimate as the final estimate and/or may average the estimates, etc.

If the difference meets and/or exceeds the threshold difference (e.g., the difference between the two estimates is 3 meters and the detected object is a passenger vehicle associated with a threshold difference of 2 meters), the techniques may choose one of the primary depth estimate or the secondary depth estimate by: comparing the first depth estimate and the second depth estimate to an output of a monocular image model (e.g., a machine-learned model that takes an estimated height of the detected object and/or a classification of the detected object as input and outputs a probability distribution of depths that, for a specific depth measurement, identifies a probability density that the depth measurement corresponds to the object); comparing a first density of LIDAR points associated with the first depth estimate to a second density of LIDAR points associated with the second depth (e.g., to identify which is associated with a greater density and/or greater number of LIDAR points); and/or comparing the first depth estimate and the second depth estimate to an object track associated with the object. In some examples, an object track may include previous positions of a detected object, a velocity of the detected object, and/or a predicted position and/or velocity of the detected object. In some examples, one of the primary depth estimate or the secondary depth estimate may be identified as the output depth estimate to be associated with the detected object. In some examples, the other of the two may be discarded or associated with an occluding object.

In some examples, scoring a LIDAR point may include determining, from a probability distribution generated by a monocular image model (e.g., a machine-learned model that takes a detected object and/or a classification of the detected object of an image as input and outputs a probability distribution over representative depths), a probability density associated with the distance measurement identified by the LIDAR point (e.g., a probability density representative of a probability per unit length). The scoring may additionally or alternatively include projecting the LIDAR point from three-dimensional space into the ROI in two-dimensional space so that the projected LIDAR point is associated with a two-dimensional coordinate; determining a distance of the two-dimensional coordinate to a center of the ROI; and generating a factor (e.g., a scalar) that is based at least in part on the distance (e.g., as the distance increases, the factor decreases). In some examples, generating the score for the LIDAR point includes multiplying the probability density by the factor.

In some examples, the techniques may include fusing vision data and LIDAR data into a single dataset by projecting the three-dimensional LIDAR points into the ROI so that an individual projected LIDAR point (i.e., a "projection" of the LIDAR point into image space that is two-dimensional) corresponds with a coordinate of an image. In some examples, this fusion may be improved by tracking a velocity of deviations of the camera and/or LIDAR sensor from a normal plane (e.g., shaking due to environmental disturbances).

The techniques discussed herein may improve functioning of a computer by equipping the computer to be able to determine the depth of a detected object in an image. Moreover, the techniques may improve the accuracy of depth estimates of an object over stereo camera techniques and/or using a monocular image model exclusively. The techniques also reduce the number of image sensors necessary to provide depth perception for a particular FOV, for example, by providing depth estimates using a monocular image as opposed to requiring multi-view or stereo geometry reconstruction. This elimination of redundant sensor(s) correspondingly reduces the number of computational cycles necessary to achieve depth perception and reduces the consumption of other such as power and/or networking bandwidth. Furthermore, during preliminary experimentation the techniques discussed herein provided a depth estimate for a detected object in approximately 6 milliseconds or less, making the depth estimate useful for real-time applications, such as controlling an autonomous vehicle.

Example Scenario

FIG. 1A illustrates an example image 100 that includes a detected object 102, in this example a van, and ROI 104 generated to identify the location of the detected object in the image. The ROI 104 in FIG. 1A is indicated by a two-dimensional bounding box. However, it is understood that any other suitable method may be used to indicate a group of pixels of the image that correspond to the image (e.g., a pixel mask identifying discrete pixels associated with the vehicle, which may generally be referred to as an instance). In some examples, the image and/or bounding box may be generated by a vision system of an autonomous vehicle and received by a perception system of an autonomous vehicle for the perception system to determine a depth associated with the detected object.

Figure 1B:
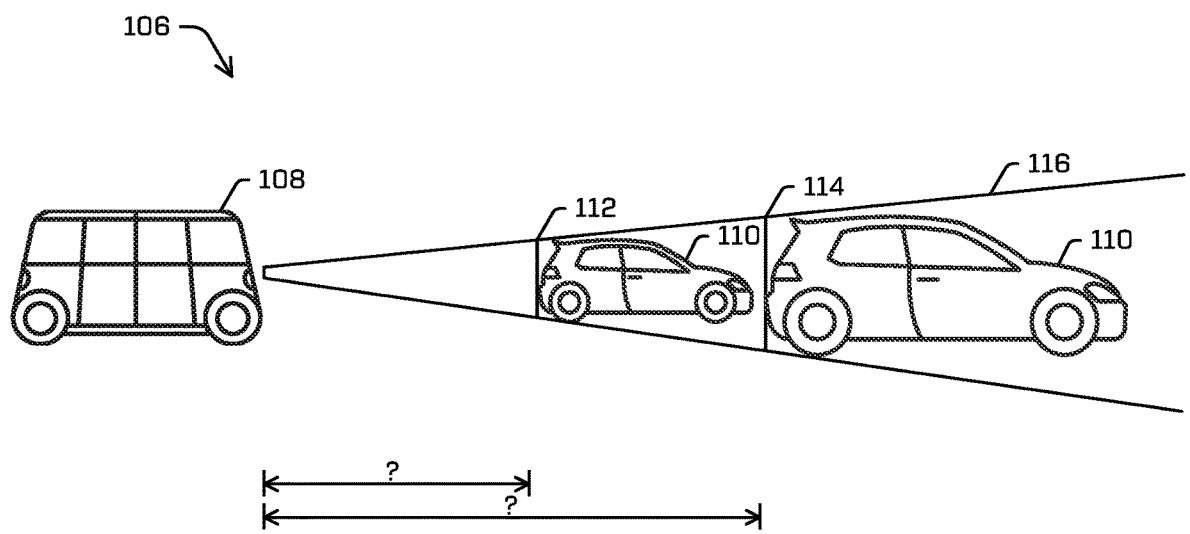
FIG. 1B illustrates a block diagram of an example scenario illustrating the depth perception problem.

FIG. 1B illustrates a block diagram of an example scenario 106 that illustrates the depth perception problem (or scale ambiguity) more thoroughly. FIG. 1B depicts an example vehicle 108 (e.g., an autonomous vehicle that includes a camera) that has taken an image and detected an object (e.g., a vehicle 110) within the image. The example vehicle 108 may have identified pixels corresponding to the detected object 110 using a bounding box, however, the image only provides positional data in two dimensions, horizontally and vertically relative to the camera's position. Therefore, the image is insufficient to identify the depth of the detected object 110 relative to the camera—the detected object 110 could equally be located at depth 112 or depth 114, which correspond to the surface of the detected object 110 captured in the image. Hypothetically, the rays indicated by 116 originating at the camera of the example vehicle 108 may be bounded by the edges of the ROI, but could extend infinitely away from the camera.

Example Lidar Data

Figure 2A:
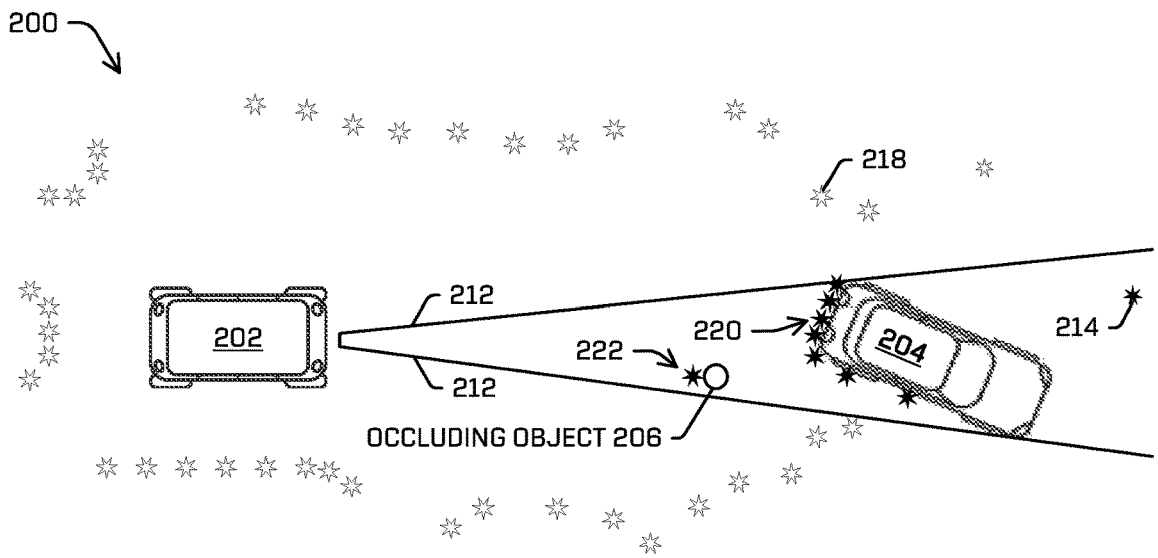
FIGS. 2A & 2B illustrate a birds-eye perspective and a side profile, respectively, of an example scenario, and LIDAR data that may correspond to the elements of FIG. 2C.
Figure 2B:
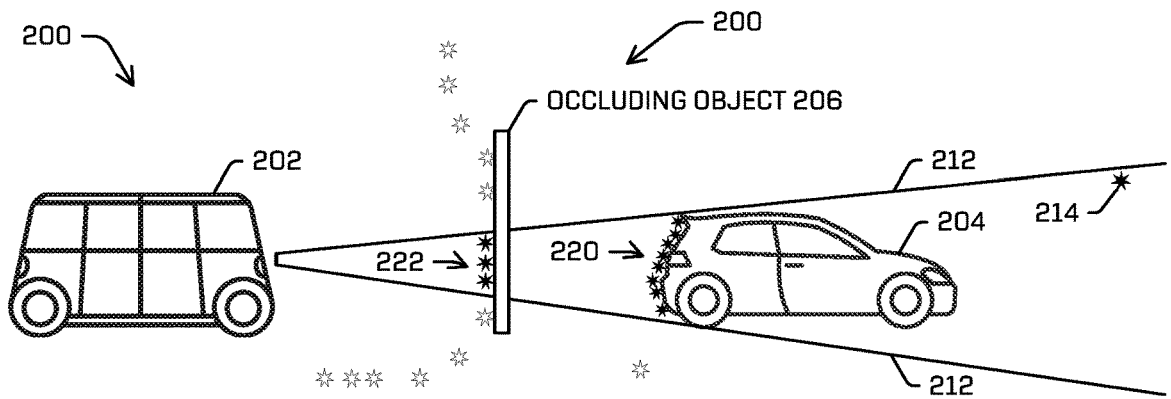

FIGS. 2A & 2B illustrate a birds-eye perspective and a side profile view, respectively, of an example scenario 200, example LIDAR data represented by stars and captured by a LIDAR sensor of an example vehicle 202, an example detected object 204, and an example occluding object 206 (e.g., a pole of a signpost). For example, the LIDAR data depicted may represent the LIDAR data captured in one metaspin. It is understood that, in practice, a point cloud would likely contain tens of thousands, or more, points, instead of the tens that are depicted here. The vehicle 202 may represent an autonomous vehicle equipped with at least a camera and a LIDAR sensor.

In the depicted example scenario 200, the vehicle 202 may have already captured an image (208) using the camera, detected the object 204 in the image 208, generated the ROI 210 to identify the location of the detected object 204 within the image, and determined data associated with a metaspin that most closely corresponds in time to a time the image was taken. The rays 212 represent the boundaries of the ROI 210, which may correspond to any point within the two-dimensional bounds of the ROI 210 and is therefore unlimited in a third dimension (i.e., depth in this case). Therefore, the rays (or lines) 212 are associated with a frustum corresponding to the camera (e.g., a sensor plane, an image plane, and the like) and may continue infinitely, although a perception engine may limit the extent of the rays 212 by a tolerable limit of the LIDAR sensor (e.g., 150 meters) to identify the LIDAR points that may reasonably correspond to a detected object. In some examples, RADAR points may be used beyond the tolerable limit of the LIDAR sensor and/or RADAR data may be additionally or alternatively be used. In some examples, where both LIDAR data and RADAR data are used, the RADAR data may be weighted more heavily at further distances (e.g., outside 150 meters or 100 meters of the vehicle 202) and LIDAR more heavily at closer distances (e.g., within 150 meters or 100 meters of the vehicle 202). It is also contemplated that LIDAR data may be heavily weighted at further distances and RADAR data at closer distances. Although the specification discusses LIDAR data, the techniques discussed herein may equally be applied to a system that receives data from any sensor that detects a three-dimensional position of surface(s) (e.g., LIDAR, RADAR, any sensor that may generate a point cloud or other representation of surfaces of an environment).

In some examples, a perception system may determine which LIDAR points correspond with the ROI 210 based at least in part on a position and/or orientation of the camera in space relative to a position and/or orientation of the LIDAR sensor, distances and angles associated with individual points of the LIDAR data, and/or the rays 212. The LIDAR points determined to correspond to the ROI 210 are shown by shaded stars, such as LIDAR point 214, whereas the remaining LIDAR points that lie outside the ROI 210 are shown with white centers, such as LIDAR point 218.

The depicted example includes LIDAR points that correspond with the ROI 210 and that include a cluster 220 of LIDAR points that correspond to a surface of the detected object 204, a cluster 222 of LIDAR points that correspond to a surface of the occluding object 206, and a LIDAR point 214 that corresponds to a surface of an object in the background of the image 208.

Figure 2C:
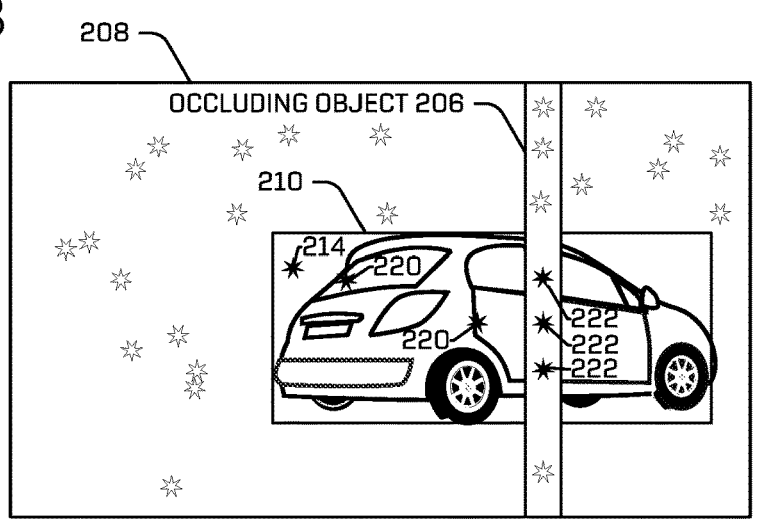
FIG. 2C illustrates an example image that includes an example detected object, an example region of interest, an example occluding object, and example LIDAR data projected onto the image.

In some examples, once the perception engine identifies the LIDAR points that correspond with the ROI 210 (indicated by the shaded stars), the perception engine may project the LIDAR points (i.e., clusters 220 and 222 and point 214 in this example) into the image 208, as depicted in FIG. 2C. This may include projecting LIDAR points to corresponding image coordinates, as would be appreciated. Additionally or alternatively, this may include projecting three-dimensional LIDAR points into two-dimensional projected LIDAR points (i.e., projections). Note that the number of LIDAR points in the cluster 222 corresponding to the surface of the detected object 204 have been reduced to two points in FIG. 2C for simplicity.

Example Lidar Point Scoring

Figure 3:
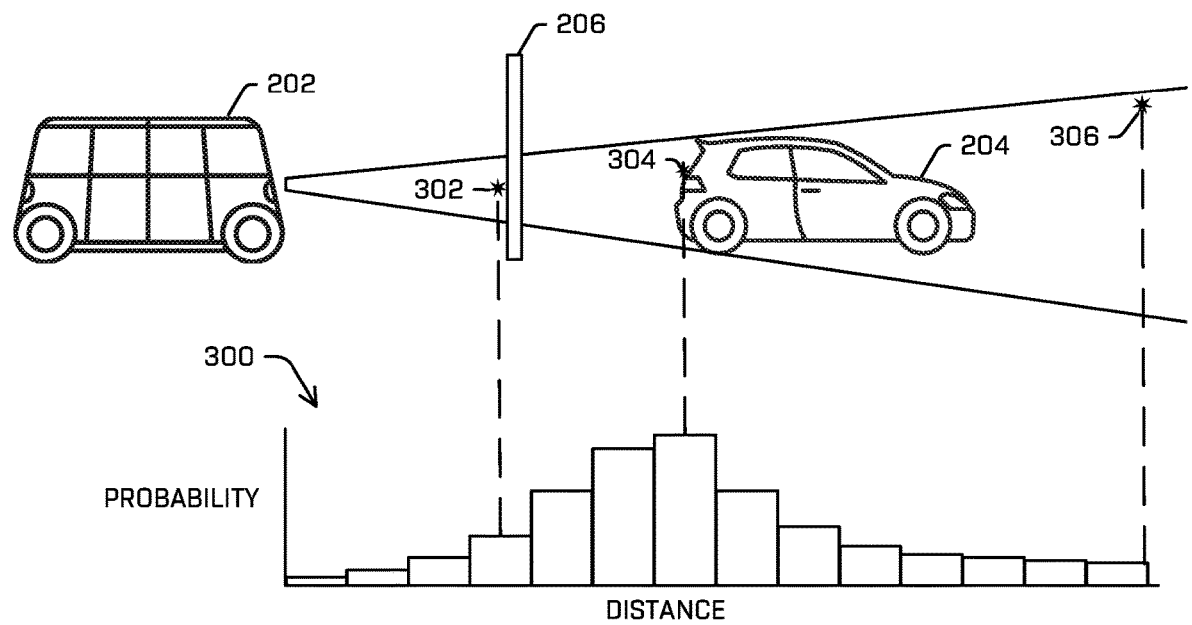
FIG. 3 illustrates a block diagram of an example probability distribution generated by a machine-learned model that corresponds to the example scenario of FIGS. 2A-2C, and example probabilities associated with three example LIDAR points.

FIG. 3 illustrates a diagram of an example probability distribution 300 generated by a monocular image model that corresponds to the example scenario of FIGS. 2A-2C and example probabilities associated with three example LIDAR points, 302, 304, and 306.

In some examples, to identify the depth of the detected object, a monocular height may be used that takes as input an object classification and/or the ROI 210. U.S. application Ser. No. 15/453,569, titled "Object Height Estimation from Monocular Images" and filed Mar. 8, 2017 describes such a model and is incorporated herein by reference. The monocular image model may include a machine-learned model such as, for example, a convolutional neural network (CNN). In some examples, the monocular image model may receive an image (e.g., the ROI 210) and/or object classification as input and may output a probability distribution similar to the example probability distribution 300.

In some examples, as in FIG. 3, the probability distribution 300 may include a series of bins, each bin representing an estimated size range for the object and/or an estimated distance of the object. FIG. 3 depicts the latter case—different bins are associated with a range of estimated distances and a probability. For example, the probability may be a probability that the distance measurement is associated with the object, based on a classification of the object and/or a height estimate of the object. As a non-limiting example, an output having eight bins may represent depth distributions according to 0-2 m, 2-4 m, 4-6 m, 6-8 m, 8-10 m, 10-100 m, where the value associated with each bin is indicative of a probability that the depth associated with the data lies within that bin. Although the bins are depicted in FIG. 3 as being of equal width, it is understood that the bins may have different widths (e.g., the bin widths may be calculated to correspond to a quarter or a half of a standard from a mean of the probability distribution). In some examples, the first and last bins may represent data not under a minimum depth and not over a maximum depth. In some examples, distributions in the first and last bins may be scaled (e.g., linearly, exponentially, as a Gaussian, or any other distribution). In examples where the system estimates the depth of the detected object 204 using only an output of the monocular image model, the system may retrieve an estimated size of the object from a bin associated with the highest probability.

In the depicted example, and in a system using the improved techniques discussed herein, the techniques may include identifying, from the probability distribution 300, a probability that corresponds to a depth measurement associated with a LIDAR point. For example, in FIG. 3, LIDAR point 306 is associated with a lowest probability, LIDAR point 302 is associated with a slightly higher probability, and LIDAR point 304 is associated with a highest probability of the three LIDAR points depicted.

In some examples, the techniques may include determining, from the probability distribution 300, a probability density that corresponds to a depth measurement identified by a LIDAR point. A probability density may be the height of a bin (i.e., the probability) modified (e.g., divided) by a width of the bin, although other methods of calculating the probability density to account for the height and width are contemplated. This probability density may be indicative of a probability density associated with the distance measurement.

In some examples, the probability distribution 300 may further include a mean, standard deviation, and/or a confidence score. The techniques discussed herein may include generating a probability distribution over estimated depths for an ROI, such as ROI 210, identifying a probability and/or probability density associated with each LIDAR point. In some examples, the techniques discussed herein include inputting the ROI into the monocular image model and, in some examples, may additionally input an object classification into the monocular image model as well (e.g., an indication determined by a perception system of the vehicle 202 such as, for example, "passenger vehicle," "compact vehicle," "delivery truck," "semi-truck," "pickup truck," "bicycle," "pedestrian").

Figure 4A:
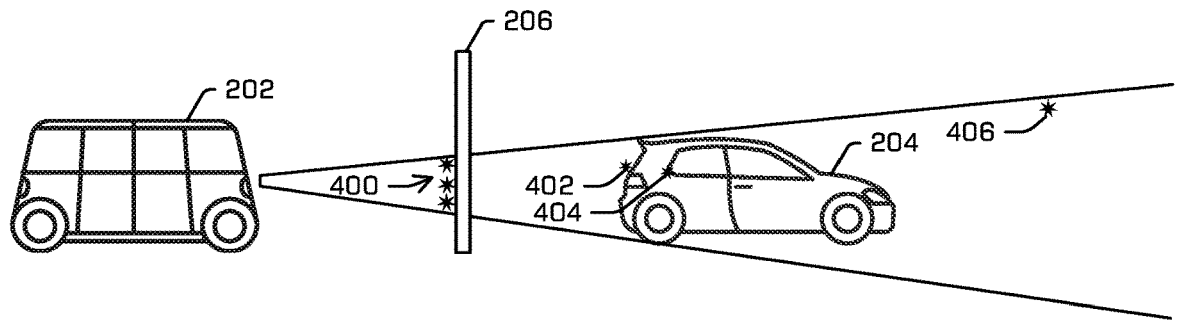
FIG. 4A illustrates a side profile view of depth measurements associated with a few select example LIDAR points for discussion in subsequent figures.

FIG. 4A illustrates a side profile view of depth measurements associated with a few select example LIDAR points for discussion in subsequent figures. These example LIDAR points include a cluster of LIDAR points 400 associated with a surface of the occluding object 206, two points (402 & 404) associated with a surface of the detected object 204, and a LIDAR point 406 associated with a surface of an object in a background of the ROI 210.

Figure 4B:
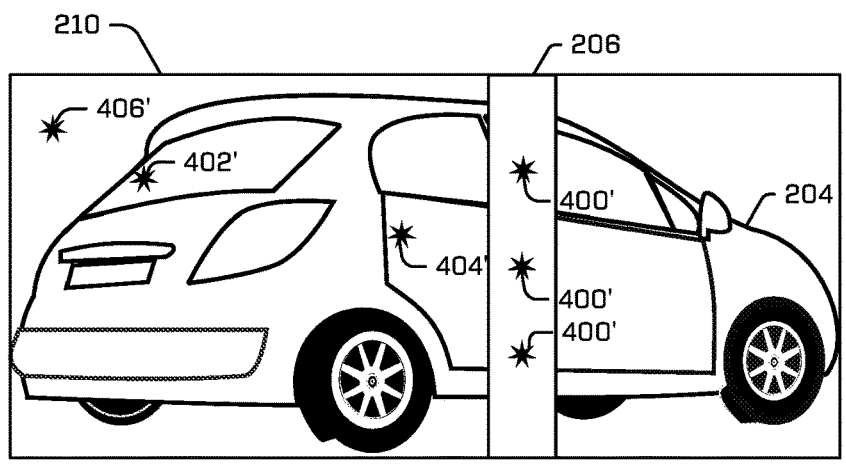
FIG. 4B illustrates projections of the select example LIDAR points into the region of interest for discussion in subsequent figures.

FIG. 4B illustrates example projections of the example LIDAR points 400-406 into the corresponding image for discussion in subsequent figures. In some examples, a perception engine of the vehicle 202 may project three-dimensional LIDAR points 400 into the image (which should project into the ROI 210) to produce two-dimensional LIDAR projections. Projected LIDAR points 400' may be the projections of LIDAR points 400 into image space. Projected LIDAR point 402' may be a projection of LIDAR point 404 into image space. Projected LIDAR point 404' may be a projection of LIDAR point 404 into image space. Projected LIDAR point 406' may be a projection of LIDAR point 406 into image space. In some examples, projecting an individual LIDAR point into the image may associate the individual LIDAR point with an image coordinate based at least in part on the coordinate being a nearest coordinate to the projection of the individual LIDAR point into the image.

Figure 4C:
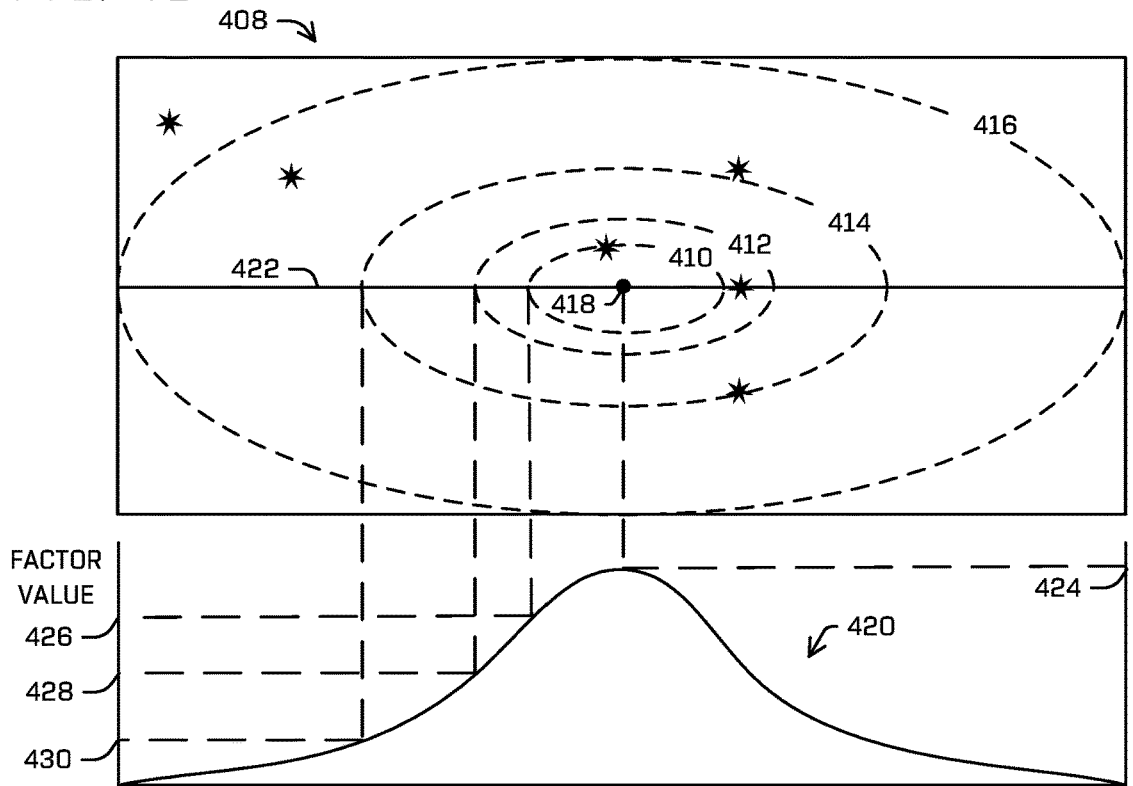
FIG. 4C illustrates an example distribution for generating a factor for LIDAR points based at least in part on distance of the lidar point projections from a center of the region of interest.

The techniques discussed herein may include generating scores for those LIDAR points determined to correspond to the ROI 210 in spatial position and time. The perception engine of the vehicle 102 may generate a score for an individual LIDAR point based at least in part on a factor that may be inversely proportional to the distance of the projected individual LIDAR point from a center of the ROI 210, as FIG. 4C illustrates. In some examples, this distance may be fit to or otherwise correspond with a factor defined by a two-dimensional Gaussian distribution normalized to the size of the ROI 210 and/or a parabola to generate the factor, though any other association is contemplated (e.g., Euclidian distance, linear, quadratic, polynomial, etc.). In some examples, the distribution may be normalized such that a furthest edge or corner of the ROI 210 is two standard deviations from the center of the ROI 210.

FIG. 4C depicts an example of a distribution 408 that includes contour rings 410, 412, 414, and 416, which indicate decreasing values of the factor based on increasing distance from the center 418 of the ROI. For the sake of discussion, center 418 may corresponding to a point (x=0, y=0) in Euclidian space, although the vision system may reference pixels of the ROI in any other suitable manner. FIG. 4C also depicts projected LIDAR points 400'-406' without including their number identifiers, for clarity. FIG. 4C also shows a representation 420 of the distance score function, such as may be determined passing through the line 422, y=0, and the factor values that correspond to the contour rings 410, 412, 414, and 416. For example, the center 418 is associated with a greatest factor value 424. The factor value at a point in the ROI 210 corresponding to y=0 and an x-value defined by contour ring 410 may be found to be a factor value 426 so on for y=0 and x-values defined by contour rings 412 and 414, which may correspond to factor values 428 and 430, respectively. Though illustrated in FIG. 4C pictorially, such a factor may be determined using the following equation:

$$C = Ae^{-\left(\frac{(x-x_c)^2 + (y-y_c)^2}{d^2}\right)},$$

where A represents some defined maximum score, $(x_c, y_c)$ represents a center of the ROI 210 in image coordinates, and d represents some desired factor associated with the width of such a distribution.

It is understood that, although the score or factor is depicted as a Gaussian distribution, any suitable distribution could be used such as, for example, a scalar based purely on Euclidian distance, a distribution that includes multiple local maxima (e.g., where multiple objects are detected or for particular types of environments, such as using Gaussian mixture models), a parabola, etc, as well as any inverse of the aforementioned scoring functions (e.g. scoring functions which increase as the point moves away from a center of an ROI).

In some examples, the techniques discussed herein may include determining a factor (e.g., a scalar) for the projected LIDAR points based at least in part on a distance of the (two-dimensional) projected LIDAR points from a center 418 of the ROI 210. This factor may additionally or alternatively be based on a distribution determined relative to a distance from the center 418, as discussed above.

In some examples, the techniques discussed herein may generate an overall score for the LIDAR points corresponding to the ROI 210 in space and time, where generating an overall score for an individual LIDAR point may be based at least in part on a probability and/or probability density associated with a probability distribution generated by the monocular image model, as discussed in connection with FIG. 3, and/or a factor associated with the individual LIDAR point, as discussed in connection with FIG. 4C. In some examples, the score may be generated by multiplying the probability and/or probability density by the factor.

Example Process

Figure 5A:
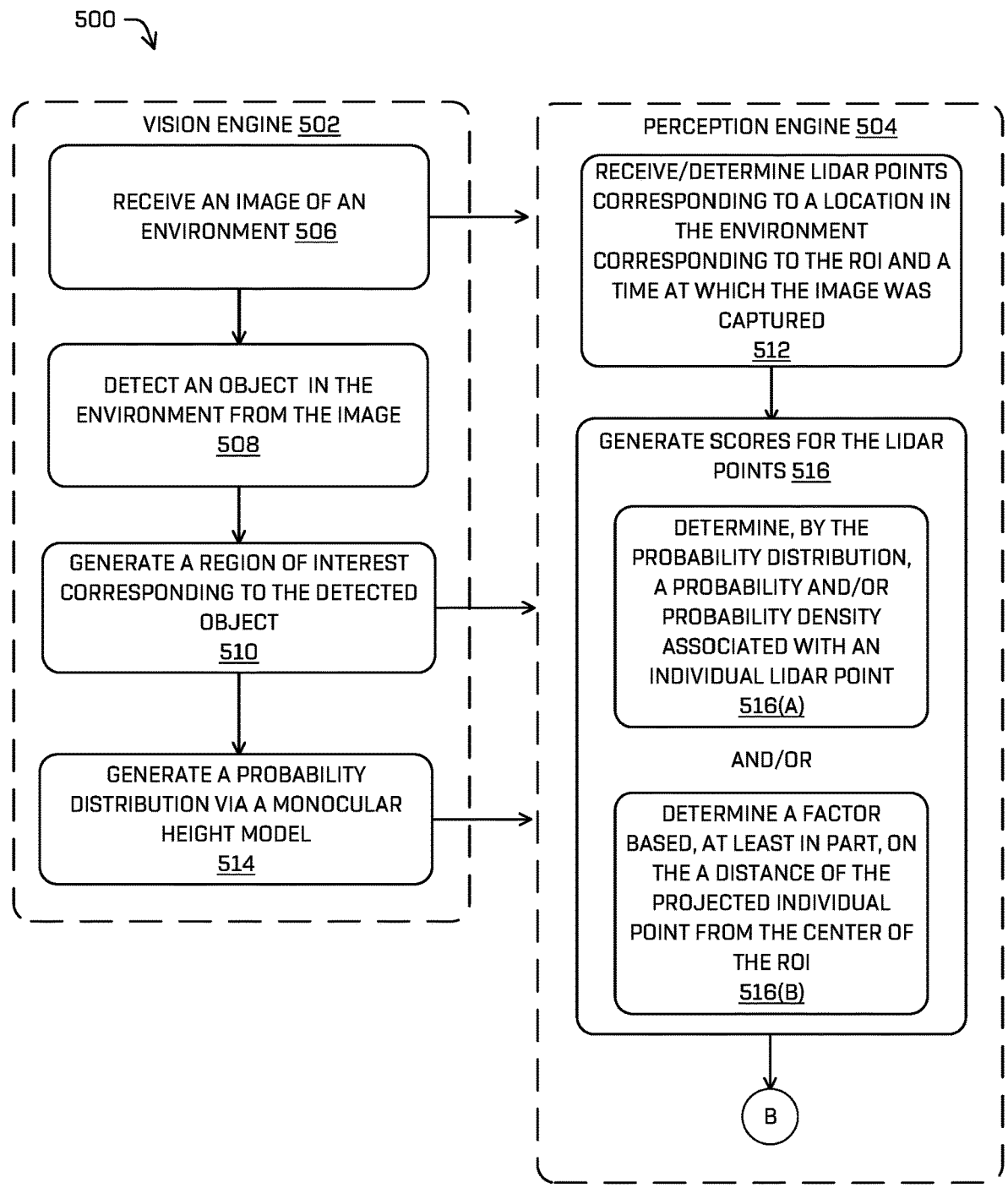
FIGS. 5A-5C illustrate an example process for determining a depth estimate for an objected detected in an image.
Figure 5B:
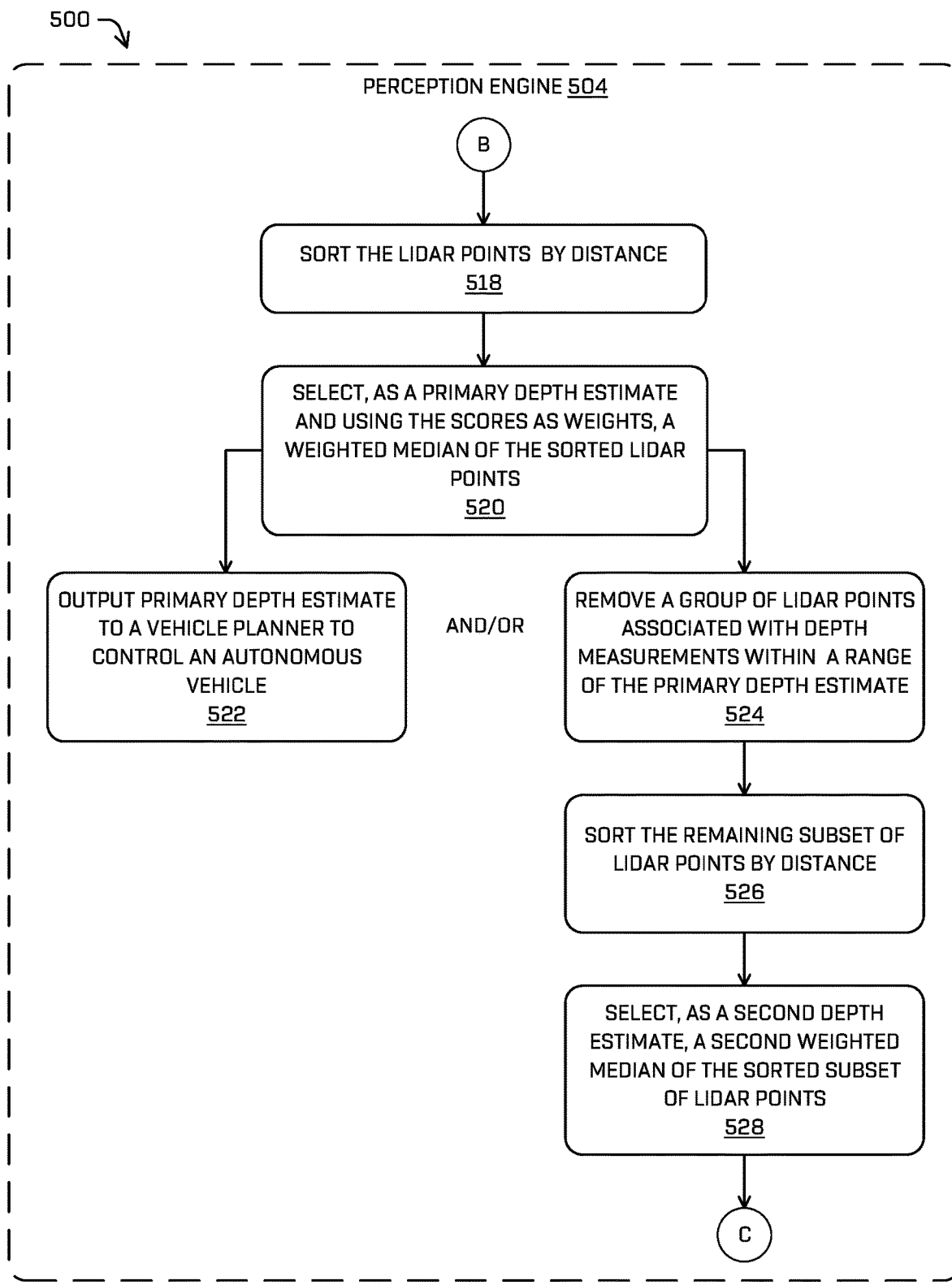
Figure 5C:
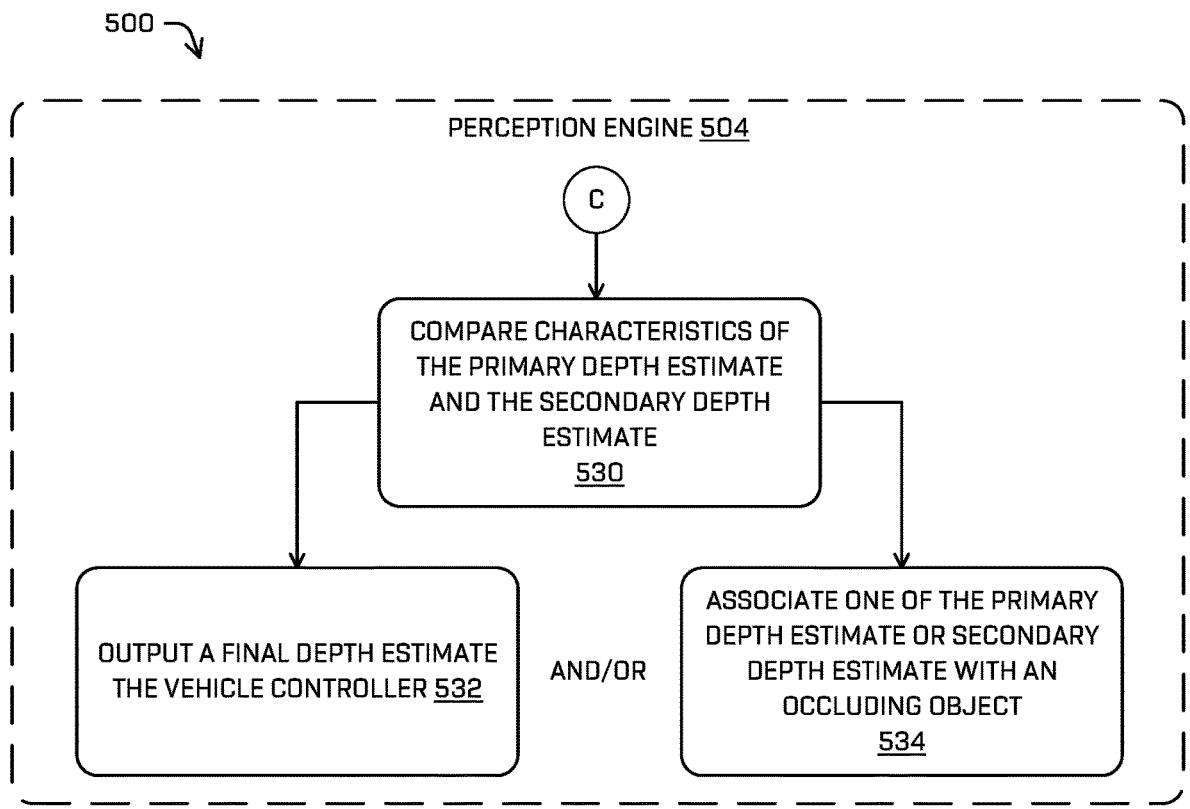

FIGS. 5A-5C illustrate an example process 500 for depth perception for a monocular image (e.g., determining a depth estimate for an objected detected in an image). In some examples, the example process 500 may be conducted by a vision engine 502 and/or a perception engine 504. It is understood that, although some operations are depicted as being conducted by one of these engines, it could additionally or alternatively be conducted by the other engine. In some examples, the vision engine 502 and/or a perception engine 504 may be part of an autonomous vehicle system for controlling an autonomous vehicle. In some examples, the vision engine 502 and the perception engine 504 may conduct one or more of the operations discussed herein in parallel. For example, FIGS. 5A and 5B illustrate the vision engine 502 and the perception engine 504 operating in parallel. It is also understood that the vision engine 502 and the perception engine 504 may conduct one or more of the operations serially (e.g., where an operation at one engine requires a product of an operation at the other engine).

At operation 506, the example process 500 may include receiving an image of an environment, according to any of the techniques discussed herein. In some examples, the image may be a monocular image (whether color (e.g., RGB), grayscale, IR, UV, or the like), although it is understood that the image may be a stereo image (or otherwise multi-view image) and that the example process 500 may also be used to improve or verify depths associated with such an image. In some examples, a camera on an autonomous vehicle may capture the image.

At operation 508, the example process 500 may include detecting an object (e.g., object 102, object 204) in the environment from the image, according to any of the techniques discussed herein. In some examples, the perception engine 504 may detect the object.

At operation 510, the example process 500 may include generating an ROI (e.g., ROI 104, ROI 210) corresponding to the detected object, according to any of the techniques discussed herein. For example, operation 514 may include generating a bounding box, instance segmentation, mask, or other identifier of image coordinates (e.g., pixels) associated with the objected detected in the image. Although depicted as two operations, it is understood that operations 508 and 510 and/or any other pair of operations may be performed substantially simultaneously. That is, an image may be put into a detector, an output of which is an indication (e.g., one or more bounding boxes) of detections of a particular object or objects. In some examples, example process 500 may begin by receiving the ROI and/or object data (e.g., an object classification).

At operation 512, the example process 500 may include receiving LIDAR data and/or determining LIDAR points of the LIDAR data that corresponds to the ROI and/or a time at which the image was captured, according to any of the techniques discussed herein. For example, see the shaded stars of FIGS. 2A-2C, as opposed to the white-filled stars of FIGS. 2A-2C. In some examples, this may additionally or alternatively include RADAR points received from a RADAR sensor. In some examples, RADAR data may be used for data points beyond a maximum range of the LIDAR (e.g., 100 meters). In some examples, determining the LIDAR data that corresponds in space and time to the ROI includes a geometric calculation based on a known position and orientation of the camera and LIDAR sensor and depth measurements associated with the LIDAR points. In some examples, "depth measurement" associated with a LIDAR point may include a distance from the LIDAR sensor and an angle relative to an axis of the orientation of a LIDAR emitter/receiver pair. In an additional or alternate example, determining the LIDAR points that correspond to the ROI may include projecting the LIDAR points into an image space corresponding to the ROI and determining the LIDAR points that are associated with image coordinates within the ROI.

At operation 514, the example process 500 may include generating, via a monocular image model such as the model discussed in FIG. 3, a probability distribution of depths for the detected object in the ROI of the image, according to any of the techniques discussed herein.

At operation 516, the example process 500 may include generating scores for the LIDAR points, according to any of the techniques discussed herein. In some examples, this may include generating a distinct score for each LIDAR point of the LIDAR points. In some examples, scores may be generated for all the LIDAR points by a same process for generating a score for an individual LIDAR point. Generating a score for an individual LIDAR point may include operation 516(A), which yields a probability and/or probability density in association with the LIDAR point, and/or operation 516(B), which yields a factor in association with the LIDAR point. In some examples, generating the score may include multiplying the probability density determined at operation 516(A), by the factor determined at operation 516(B).

In some examples, generating the score for the LIDAR point may include associating the probability and/or probability density with the LIDAR point, associating the factor with the LIDAR point, and/or associating a product of the probability and/or probability density and the factor with the LIDAR point. For example, determining the score for a LIDAR point may include determining a height and width of a bin of the probability distribution associated with a distance defined by the LIDAR point, determining a probability density based at least in part on the height and width, determining a factor based at least in part on a distance of the projected LIDAR point from a center of the ROI, and determining the score for the LIDAR point by multiplying the probability density by the factor.

At operation 516(A), the example process 500 may include determining a probability and/or probability density to associate with the individual LIDAR point, according to any of the techniques discussed herein. This may include determining a point on the probability distribution that corresponds with a depth measurement of the LIDAR point. In some examples, this may include associating that LIDAR point with a bin on the probability distribution and a probability associated therewith, as well as (at least in some examples) modulating (e.g. dividing) the value by the width of the associated bin to determine a probability density associated therewith.

At operation 516(B), the example process 500 may include determining a factor to associate with an individual LIDAR point, according to any of the techniques discussed herein. In some examples, operation 516(B) may include determining a factor for each LIDAR point. Operation 516(B) may include projecting the individual LIDAR point into an image space of the ROI to determine a distance from the individual LIDAR projection to a center of the ROI. The projected LIDAR point may thereby be associated with coordinates in an image space of the ROI. In some examples, the factor assigned to a LIDAR point may decrease in magnitude as a distance of the LIDAR point's projection from the center of the ROI increases. In some examples, this decrease may be defined by a Gaussian distribution, a Euclidean distance, a parabola, a topology that includes multiple local maxima, etc. See at least FIGS. 4A-4C and the accompanying discussion for more details.

Turning to FIG. 5B, at operation 518, the example process 500 may include sorting the LIDAR points by distance, according to any of the techniques discussed herein. For example, the LIDAR points are associated with depth measurements that define at least a distance and, in some examples, an angle (or angles—e.g., azimuth and elevation). In some examples, the LIDAR points are sorted from least distance to greatest distance, but this may be reversed. In other words, the LIDAR points define at least a distance, therefore, the LIDAR points are sorted by according a magnitude of this distance. In at least some examples, a percentage of the furthest and closest LIDAR points may be discarded (e.g., the closest and furthest 5%) before proceeding.

At operation 520, the example process 500 may include determining a weighted median of the sorted LIDAR points and selecting, as a primary depth estimate, a depth measurement associated with the weighted median, according to any of the techniques discussed herein. In some examples, the scores generated for the LIDAR points may be used as the weights for the weighted score determination. For example, for n distance-sorted LIDAR points, $x_1, x_2, \ldots x_n$, the weighted median may be found by normalizing the scores corresponding to the LIDAR points, $w_1, w_2, \ldots w_n$ such that $$\sum_{i=1}^{n} w_i = 1$$

and where the weighted median may be the LIDAR point, $x_k$, satisfying:

$$\sum_{i=1}^{k-1} w\_i \leq 1/2 \text{ and } \sum_{i=k+1}^{n} w_i \leq 1/2$$

In some examples, the primary depth estimate may include the LIDAR point itself that corresponds to the weighted median (e.g., a distance and an angle) or, other examples, the primary depth estimate may include the distance and/or a projection of the LIDAR point onto a ray from the camera through a point on the detected object such as, for example, the center of the ROI.

In some examples, example process 500 may exclude at least operation 516 and may determine a median of the LIDAR points without generating scores for the LIDAR points. However, in some cases, omitting the operation 516 may decrease accuracy of the depth estimate.

At operation 522, the example process 500 may include outputting the primary depth estimate to a vehicle planner for the vehicle planner to control an autonomous vehicle based at least in part on the position of the detected object, according to any of the techniques discussed herein. In some examples, the perception engine 504 may output the ROI and the depth estimate and this may be sufficient to identify a position of the detected object in the environment. In some examples, the perception engine 504 may output at least a position and, in some examples, a size and/or orientation of the detected object based at least in part on the depth estimate and/or corresponding ROI which may be relative to a local and/or global map and stored therewith. In some examples, the depth estimate may be used to conduct a geometric calculation to determine a size of the detected object.

At operation 524, the example process 500 may additionally or alternatively include removing a portion of LIDAR points from the LIDAR points, according to any of the techniques discussed herein. The portion of LIDAR points may be associated with distance measurements that less than and/or greater than one or more distance thresholds. For example, the perception engine 504 may remove LIDAR points associated with distance measurements that are less than 1 meter and/or are more than 1 meter from the primary depth estimate, though such distance thresholds need not be symmetrical. References to "in front" may be construed to include points lying between the primary depth estimate and the LIDAR device and "behind" may be construed to mean lying beyond the primary depth estimate, away from the LIDAR device. In some examples, the range may include distance measurements that lie within 0.8 meters in front of the primary distance measurement to 1.6 meters behind the primary distance measurement. In some examples, the range may include distance measurements that lie within 1.6 meters in front of the primary distance measurement to 1.6 meters behind the primary distance measurement. Many variations are contemplated and the range may vary based at least in part on an object classification associated with the detected object. For example, the range may be defined as 0.8 meters in front to 3 meters behind for a detected object classified as a "delivery truck," 0.5 meters in front to 1.2 meters behind for a detected object classified as a "compact vehicle," or 1 meter in front to 8 meters behind for a detected object classified as a "semi-truck." Equivalently, operation 524 may be accomplished by identifying a subset of LIDAR points that are associated with distance measurements that lie outside the range.

This removal of the group of LIDAR points may be effective to remove points attributable to an occluding object (e.g., occluding object 206) such as, for example, LIDAR points 400'. LIDAR points such as those depicted in 400' may overwhelm the LIDAR points truly corresponding to the detected object, such as LIDAR points 402' and 404', in some cases. This removal seeks to identify a secondary depth estimate.

At operation 526, the example process 500 may include sorting, by distance, the subset of LIDAR points that are associated with depth measurements that lie outside the range, according to any of the techniques discussed herein.

At operation 528, the example process 500 may include determining a second weighted median of the sorted subset of LIDAR points and selecting, as a secondary depth estimate, a depth measurement associated with the second weighted median, according to any of the techniques discussed herein. In other words, the first weighted median discussed above is a weighted median of all the LIDAR points that are associated with the ROI, whereas the second weighted median is a weighted median of a subset of those LIDAR points, e.g., those LIDAR points associated with distances that lie outside the range discussed above and/or those LIDAR points associated with distances that lie inside the range discussed above.

At operation 530, the example process 500 may include comparing characteristics of the primary depth estimate and the secondary depth estimate and/or of LIDAR points associated therewith, according to any of the techniques discussed herein. Operation 530 may differentiate between a true and false indication of depth for the detected object. For example, operation 530 may be conducted to distinguish between a depth estimate that corresponds to an occluding object instead of the object itself. In some examples, operation 530 may include comparing a number and/or a spatial density of LIDAR points associated with the primary depth estimate to a number and/or a spatial density of LIDAR points associated with the secondary depth estimate. For example, if the subset of LIDAR points outside the range and therefore associated with the secondary depth estimate is associated with a drastically lower number of LIDAR points than LIDAR points within the range, this may be indicative that the primary depth estimate is truly associated with the detected object and that the LIDAR points associated with the primary depth estimate are associated with a surface of the detected object. In some examples, operation 536 may additionally or alternatively include a density of the LIDAR points associated with the primary depth estimate and/or the secondary depth estimate, as a function of distance from a center of the ROI. The denser and further away from the center of the ROI that the secondary LIDAR points lie (i.e., LIDAR points outside the range), the more likely they may be associated with a second object (e.g., an occluding object) rather than the detected object.

Additionally, or alternatively, operation 530 may include determining, from the probability distribution generated by the monocular image model, a probability and/or probability density associated with the primary depth estimate and the secondary depth estimate. For example, the operation 530 may include determining that the primary depth estimate is associated with a probability and/or probability density that is lower than the secondary depth estimate. This may be more likely to occur when the primary depth estimate is attributable to an occluding object.

Additionally, or alternatively, operation 530 may include determine a first fit of the primary depth estimate and a second fit of the secondary depth estimate to an object track or a predicted object track. In some examples, the depth estimate that more closely corresponds to the object track or the predicted object track may be chosen as the depth estimate to be output.

In some examples, operation 530 may include a scoring function that is based at least in part on any of the techniques discussed above and that may generate a score for the primary depth estimate and the secondary depth estimate. In some examples, the object track technique may not be included in the scoring function, but may be used to break score ties.

At operation 532, the example process 500 may include outputting, based at least in part on the comparison, the primary estimate, the secondary depth estimate, and/or a mean or mode thereof to a vehicle controller (e.g., the vehicle planner), according to any of the techniques discussed herein. For example, the depth estimate associated with a higher score, higher probability and/or probability density, and/or more closely corresponding to an object track may be output to the vehicle planner as the output depth estimate associated with the detected object and relied on to control the autonomous vehicle. In some examples, the example process 500 may include outputting a mean of the primary depth estimate and the secondary depth estimate if they lie within a threshold value of each other or of a highest possible probability and/or probability density.

At operation 534, the example process 500 may additionally include discarding the depth estimate that was not output at operation 532, if only one depth estimate was selected for output, or associating that depth estimate with a second object (e.g., an occluding object), according to any of the techniques discussed herein. For example, operation 534 may include generating an indication that a second object appears in the ROI. The perception engine 504 may use this indication to re-evaluate the original image and/or the ROI in an attempt to identify a second object. This may include varying object detection techniques and/or machine-learning models used to do object detection. If a second object is detected, the other depth estimate that was not output in association with the first detected object, the other depth estimate may be output to the vehicle planner in association with the second object.

Example Architecture

Figure 6:
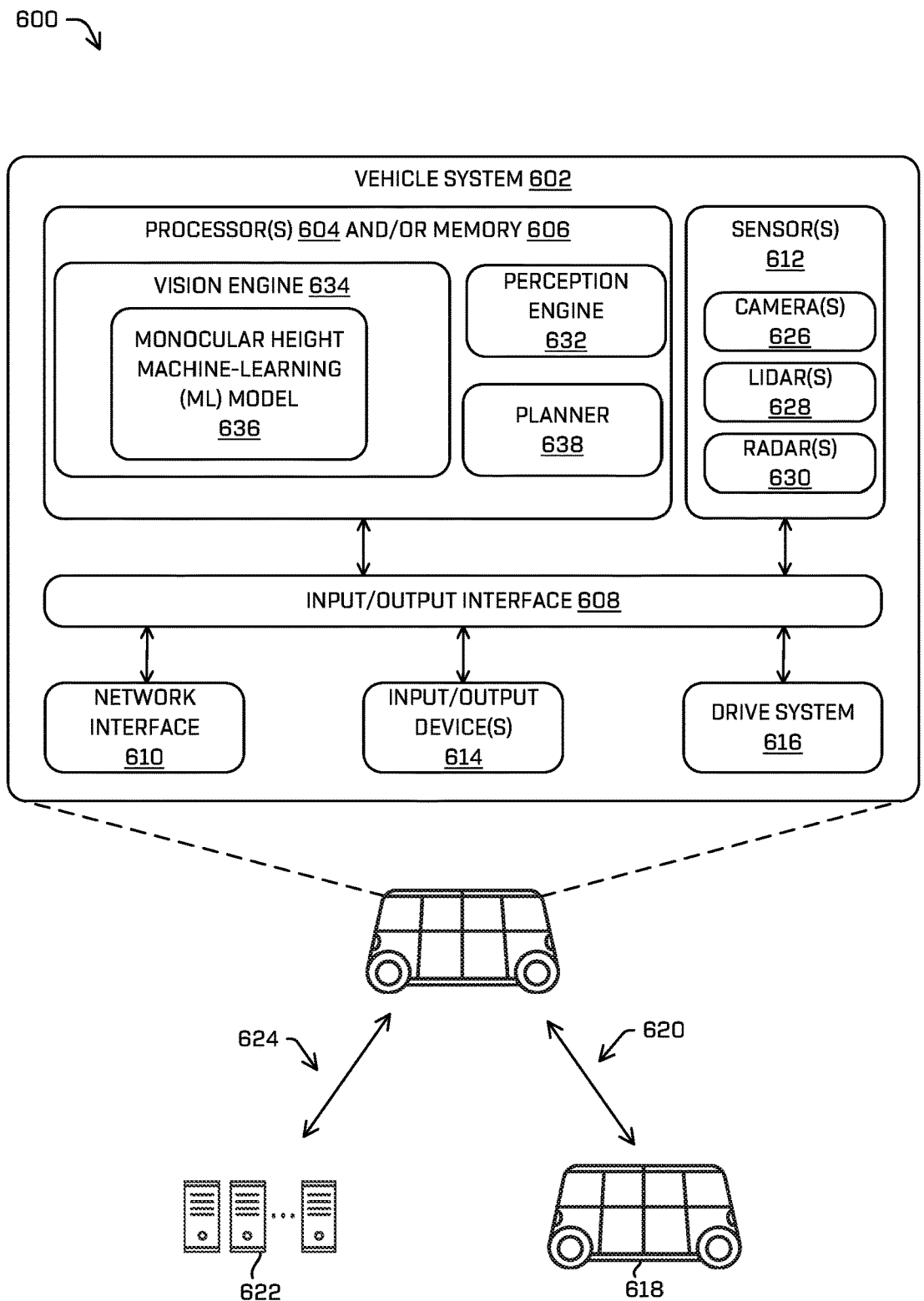
FIG. 6 illustrates a block diagram of an example autonomous vehicle that may incorporate the vision-metaspin association system discussed herein.

FIG. 6 is a block diagram of an example architecture 600 including an example vehicle system 602 for controlling operation of at least one vehicle, such as an autonomous vehicle, using a depth estimate generated according to any of the techniques discussed herein. In some examples, the vehicle system 602 may represent at least a portion of vehicle 108 and/or 202. In some examples, this architecture may be used in other machines to determine a depth of an object detected in an image.

In some examples, the vehicle system 602 may include processor(s) 604 and/or memory 606. These elements are illustrated in combination in FIG. 6, although it is understood that they may be separate elements of the vehicle system 602, and that components of the system may be implemented as hardware and/or software, in some examples.

Processor(s) 604 may include a uniprocessor system including one processor, or a multiprocessor system including several processors (e.g., two, four, eight, or another suitable number). The processor(s) 604 may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor 604 may commonly, but not necessarily, implement the same ISA. In some examples, the processor(s) 604 may include a central processing unit (CPU), a graphics processing unit (GPU), Field Programmable Gate Arrays (FPGA), Application Specific Integrated Circuit (ASIC), or a combination thereof.

The example vehicle system 602 may include memory 606. In some examples, the memory 606 may include a non-transitory computer readable media configured to store executable instructions/modules, data, and/or data items accessible by the processor(s) 604. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. A non-transitory, computer readable memory may include storage media or memory media, such as flash memory (e.g., solid state memory), magnetic or optical media (e.g., a disk) coupled to the example vehicle system 602 via an input/output ("I/O") interface 608. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface 610.

Furthermore, though illustrated as a single unit in FIG. 6, it is understood that the processor(s) 604 and memory 606 may be distributed among multiple computing devices of the vehicle and/or among multiple vehicles, data centers, teleoperation centers, etc.

In some examples, the input/output ("I/O") interface 608 may be configured to coordinate I/O traffic between the processor(s) 604, the memory 606, the network interface 610, sensor(s) 612, I/O devices 614, drive system 616, and/or any other hardware of the vehicle system 602. In some examples, the I/O devices 614 may include external and/or internal speaker(s), display(s), passenger input device(s), etc. In some examples, the I/O interface 608 may perform protocol, timing, or other data transformations to convert data signals from one component (e.g., the non-transitory computer readable media) into a format suitable for use by another component (e.g., processor(s)). In some examples, the I/O interface 608 may include support for devices attached through various types of peripheral buses, such as the Peripheral Component Interconnect (PCI) bus standard, the Universal Serial Bus (USB) standard, or a variant thereof, for example. In some implementations, the function of the I/O interface 608 may be split into two or more separate components, such as a north bridge and a south bridge, for example. Also, in some examples, some or all of the functionality of the I/O interface 608, such as an interface to the memory 606, may be incorporated directly into the processor(s) 604 and/or one or more other components of the vehicle system 602.

The example vehicle system 602 may include a network interface 610 configured to establish a communication link (i.e., "network") between the vehicle system 602 and one or more other devices. For example, the network interface 610 may be configured to allow data to be exchanged between the vehicle system 602 and another vehicle 618 via a first network 620, and/or between the vehicle system 602 and a remote computing system 622 via a second network 624. For example, the network interface 610 may enable wireless communication between another vehicle 618 and/or the remote computing device 622. In various implementations, the network interface 610 may support communication via wireless general data networks, such as a Wi-Fi network, and/or telecommunications networks, such as, for example, cellular communication networks, satellite networks, and the like.

In some examples, the sensor data and/or perception data discussed herein may be received at a first vehicle and transmitted to a second vehicle via the first network 620 and/or to a remote computing system 622 via the second network 624.

The example vehicle system 602 may include sensor(s) 612, for example, configured to localize the vehicle system 602 in an environment, to detect one or more objects in the environment, to determine a depth of an object detected in an image, to sense movement of the example vehicle system 602 through its environment, sense environmental data (e.g., ambient temperature, pressure, and humidity), and/or sense conditions of an interior of the example vehicle system 602 (e.g., passenger count, interior temperature, noise level). The sensor(s) 612 may include, for example, one or more cameras 626 (e.g. RGB-cameras, intensity (grey scale) cameras, infrared cameras, UV cameras, depth cameras, stereo cameras, monocular cameras), one or more LIDAR sensors 628, one or more RADAR sensors 630, one or more magnetometers, one or more sonar sensors, one or more microphones for sensing sounds, one or more IMU sensors (e.g., including accelerometers and gyroscopes), one or more GPS sensors, one or more Geiger counter sensors, one or more wheel encoders (e.g., rotary encoders), one or more drive system sensors, a speed sensor, and/or other sensors related to the operation of the example vehicle system 602.

In some examples, one or more of these types of sensors may be phase-locked (i.e., capturing data corresponding to substantially the same portion of an environment of the vehicle at a substantially same time) or asynchronous. For purposes of the techniques discussed herein, if the outputs of the camera(s) 626 and LIDAR(s) 628 and/or RADAR(s) 630 are asynchronous, the techniques may include determining LIDAR data and/or RADAR data that most closely corresponds to the camera data in time. For example, the perception engine 632 may make this determination.

The example vehicle system 602 may include a perception engine 632, a vision engine 634, that may include a monocular height machine-learning (ML) model 636, and a planner 638.

The vision engine 634 may include instructions stored on memory 606 that, when executed by the processor(s) 604, cause the processor(s) 604 to receive an image (e.g., a monocular image) of an environment surrounding the vehicle system 602; detect, in the image, an object in the environment; generate an ROI (e.g., a bounding box, a pixel mask) that identifies a portion of the image as corresponding to the detected object; and/or generate, via the monocular height ML model 636 and based at least in part on the ROI, an object classification received from the perception engine 632, and/or a height estimate of the detected object, a probability distribution. In some examples, the perception engine 632 may generate the ROI and/or include the monocular height ML model 636 and generate the probability distribution.

The monocular height ML model 636 may include the monocular image model discussed in regard to FIG. 3 and/or FIG. 4, and/or as discussed in U.S. application Ser. No. 15/453,569, titled "Object Height Estimation from Monocular Images" and filed Mar. 8, 2017. The monocular height ML model 636 may include instructions stored on memory 606 that, when executed by the processor(s) 604, cause the processor(s) 604 to receive an object classification, an image, and/or an ROI and generate a probability distribution, according to a configuration of the layers of the monocular height ML model 636. In some examples, the probability distribution may include probabilities indexed by distance, where an individual distance is associated with an individual probability and/or probability density that the individual distance is truly associated with the detected object. The vision engine 634 may transmit any of the data determine and generated to the perception engine 632.

The perception engine 632 may include instructions stored on memory 606 that, when executed by the processor(s) 604, cause the processor(s) 604 to receive LIDAR data from a LIDAR device; determine LIDAR points that correspond to a time that the image was captured and a region of the environment that corresponds to the ROI; generate scores for the LIDAR points; and select, as a primary depth estimate, a weighted median of the LIDAR points, where the weighted median uses the scores as weights. The perception engine 632 may additionally or alternatively output the primary depth estimate to the planner, determine a second depth estimate, and/or choose between the primary depth estimate and the secondary depth estimate to send to the planner to associate with the detected object and/or a second object, according to any of the techniques discussed herein.

In some examples, the instructions may further configure the processor(s) 604 to receive sensor data from the sensor(s) 612 as input, and output data representative of, for example, one or more of the pose (e.g. position and orientation) of an object in the environment surrounding the example vehicle system 602, an object track associated with the object (e.g., a historic position, velocity, acceleration, and/or heading of the object over a period of time (e.g. 5 seconds)), and/or an object classification associated with the object (e.g. a pedestrian, a passenger vehicle, a compact vehicle, a delivery truck, a bicyclist). In some examples, perception engine 632 may be configured to predict an object trajectory of one or more objects. For example, the perception engine 632 may be configured to predict multiple object trajectories based on, for example, probabilistic determinations or multi-modal distributions of predicted positions, trajectories, and/or velocities associated with an object.

The perception engine 632 may transmit the output depth estimate, the ROI, the image, an object classification associated with the detected object, an object track associated with the detected object, and/or any other additional information that the planner 638 may use to generate a trajectory (e.g., object classifications, object tracks, vehicle pose). In some examples, the perception engine 632 and/or the planner 638 may additionally or alternatively transmit any of this data via the network interface 610 to the remote computing device 622 via network 624 and/or another vehicle 618 via network 620, based at least in part on a confidence generated by the monocular height ML model 636. In some examples, the perception engine 632, the vision engine 634, and/or the planner 638 may be located at another vehicle 618 and/or the remote computing device 622.

In some examples, the remote computing device 622 may include a teleoperations device. The teleoperations device may be a device configured to respond to an ROI, an output depth estimate, and/or a set of a primary depth estimate and a secondary depth estimate, where the perception engine 632 was unable to break a tie between the two, with an indication of whether output depth estimate is correct and/or a selection of the primary depth estimate and/or the secondary depth estimate as corresponding to the detected object and/or a second object. In additional or alternate examples, the teleoperations device may display information related to the sensor data and/or the detected object, generated by the vision engine 634 and/or the perception engine 632, that may be useful for receiving an input from a remote operator ("teleoperator") corroborating or identifying a depth estimate. In such examples, the teleoperations device may include an interface for receiving input, such as an indication that at least one of the depth estimates a true positive or a false positive, from the teleoperator. In some examples, the teleoperations device may respond to the autonomous vehicle and/or additional autonomous vehicles corroborating the indication or identifying the indication as a false positive.

The planner 638 may include instructions stored on memory 606 that, when executed by the processor(s) 604, cause the processor(s) 604 to generate data representative of a trajectory of the example vehicle system 602, for example, using data representing a location of the example vehicle system 602 in its environment and other data, such as local pose data, and a position and/or track of the detected object, which may be based on the output depth estimate and the ROI. In some examples, the planner 638 may substantially continuously (e.g., every 1 or 2 milliseconds, though any receding horizon time is contemplated) generate a plurality of potential trajectories with which to control the example vehicle system 602 and select one of the trajectories with which to control the vehicle. The selection may be based at least in part on a current route, depth estimate of the object, current vehicle trajectory, depth estimate of the object, and/or detected object trajectory data. Upon selecting a trajectory, the planner 638 may transmit the trajectory to the drive system 616 to control the example vehicle system 602 according to the selected trajectory.

In some examples, the perception engine 632, the vision engine 634, the monocular height ML model 636, and/or the planner 638 may further include specialized hardware such as, for example, a processor that is suited to running the perception engine (e.g., a graphics processor, an FPGA).

Example Clauses

A. A system comprising: one or more processors; and one or more computer-readable media storing instructions executable by the one or more processors, wherein the instructions, when executed, cause the system to: receive an image of an environment from an image sensor; determine, based at least in part on the image, a region of interest that identifies a portion of the image as representing an object in the environment; receive LIDAR points from a LIDAR device, the LIDAR points associated with the region of interest and a time the image was captured; generate scores for the LIDAR points, wherein generating a score for the LIDAR point comprises: determining, based at least in part on a probability distribution generated by a monocular image model, a probability density associated with the depth measurement associated with the LIDAR point; and determining a factor, based at least in part on a distance in pixels between the LIDAR point projected into the image and a center of the region of interest; and determine, using a weighted median calculation, a primary depth estimate of the object, wherein weights associated with the weighted median calculation comprise the scores.

B. The system as paragraph A recites, the instructions further cause the system to: select, as a subset of LIDAR points, LIDAR points that are associated with depth measurements that are within a range of the primary depth estimate; determine a second weighted median of the sorted LIDAR points; and determine, based at least in part on the second weighted median, a secondary depth estimate of the object.

C. The system as either paragraph A or B recites, wherein the system comprises an autonomous vehicle, the camera and LIDAR being on the autonomous vehicle, and wherein the instructions further cause the system to: identify, based at least in part on the primary depth estimate or the secondary depth estimate, a position of the object in the environment; and generate, based at least in part on the position of the object, a trajectory for controlling motion of the autonomous vehicle.

D. The system as any one of paragraphs A-C recites, wherein the instructions further cause the system to: compare the primary depth estimate and the secondary depth estimate to an output of a monocular image model; compare a first density of LIDAR points associated with the primary depth estimate to a second density of LIDAR points associated with the secondary depth estimate; or compare the primary depth estimate and the secondary depth estimate to an object track associated with the object.

E. The system as any one of paragraphs A-D, wherein generating the score for the LIDAR point comprises multiplying the probability density by the factor.

F. A computer-implemented method of determining a distance from an image plane to an object, the method comprising: receiving LIDAR data and image data of an environment; determining a region of interest associated with the object detected in the environment; determining LIDAR points of the LIDAR data that correspond to the region of interest; generating scores for the LIDAR points, wherein generating a score for a LIDAR point comprises: determining a factor based at least in part on a distance from a center of the region of interest to a projection of the LIDAR point onto the image; determining a probability density of a depth measurement associated with the LIDAR point; and generating the score based at least in part on the probability density and the factor; determining, based at least in part on the scores, a weighted median of the LIDAR points; and identifying, as a primary depth estimate, a depth measurement associated with the weighted median.

G. The computer-implemented method as paragraph F recites, wherein determining the factor comprises evaluating a Gaussian centered at the center of the region of interest using the projection of the LIDAR point onto the image.

H. The computer-implemented method as either paragraph F or G recites, wherein determining the probability density comprises generating a probability distribution over a range of depths, via a machine-learning model and based at least in part on a classification of the object.

I. The computer-implemented method as any one of paragraphs F-H recites, wherein generating the score comprises multiplying the probability density by the factor.

J. The computer-implemented method of paragraph F, further comprising: identifying a subset of LIDAR points associated with distances that meet or exceed a range of depth values that comprises the primary depth estimate; sorting the subset of LIDAR points by distances associated with the subset of LIDAR points; determining, based at least in part on scores associated with the subset and the sorting, a second weighted median; and identifying, as a secondary depth estimate, a depth measurement associated with the second weighted median.

K. The computer-implemented method as any one of paragraphs F-J recites, wherein the range of depth values varies from a point 0.H meters less than the primary depth estimate to A.F more than the primary depth estimate.

L. The computer-implemented method as any one of paragraphs F-K recites, further comprising: choosing, as an output depth, the primary depth estimate or the secondary depth estimate based at least in part on at least one of: comparing a first probability density or a first probability associated with the first depth estimate by evaluating the probability distribution using the first depth estimate, to a second probability density or a second probability associated with the second depth estimate by evaluating the probability distribution using the second depth estimate; comparing a first density of LIDAR points associated with the primary depth estimate to a second density of LIDAR points associated with the secondary depth; or comparing the primary depth estimate and the secondary depth estimate to an object track associated with the object.

M. The computer-implemented method as any one of paragraphs F-L recites, wherein choosing the secondary depth estimate further comprises: indicating an existence of an occluding object that occludes at least part of the object; and associating the primary depth estimate with the occluding object and the secondary depth estimate with the object.

N. The computer-implemented method as any one of paragraphs F-M recites, further comprising: sending the output depth to a controller of an autonomous vehicle; and generating, based at least in part on the output depth, a trajectory, the trajectory configured to cause the autonomous vehicle to traverse a portion of the environment.

O. A non-transitory computer-readable medium having a set of instructions that, when executed, cause one or more processors to perform operations comprising: receiving, from a camera, an image of an environment that comprises an object; receiving a region of interest representing a location of the object in the image; receiving, from a point cloud sensor, point cloud data; determining, from the point cloud data, point cloud points that correspond with the region of interest; determining, based at least in part on the image, a probability distribution of depths; generating, based at least in part on relative coordinates of the point cloud points in an image space associated with the image and based at least in part on a position of the point cloud points relative to depths specified by the probability distribution, scores for the point cloud points; determining, by a weighted median calculation, a weighted median based at least in part on the scores; and identifying a depth measurement associated with the weighted median as a first depth estimate of the object.

P. The non-transitory computer-readable medium as paragraph O recites, the operations further comprising: determining a subset of point cloud points associated with depth measurements that lie outside a range of depths from the first depth estimate; determine a second weighted median of the subset of point cloud points; and identify a second distance associated with the second weighted median as a second depth estimate of the object.

Q. The non-transitory computer-readable medium as either paragraph O or P recites, the operations further comprising: comparing at least one of: a first probability density or a first probability associated with the first depth estimate by evaluating the probability distribution using the first depth estimate, to a second probability density or a second probability associated with the second depth estimate by evaluating the probability distribution using the second depth estimate; a first density of point cloud points associated with the first depth estimate to a second density of point cloud points associated with the second depth estimate; or the first depth estimate and the second depth estimate to an object track associated with the object; and associating, based at least in part on the comparing, one of the first depth estimate or the second depth estimate with the object.

R. The non-transitory computer-readable medium as any one of paragraphs O-Q recites, the operations further comprising generating a trajectory for controlling motion of an autonomous vehicle based at least in part on at least one of the first depth estimate or the second depth estimate.

S. The non-transitory computer-readable medium as paragraph O recites, wherein determining the factor is based at least in part on evaluating a Gaussian distribution centered at the center of the region of interest with respect to a distance of the projection of the LIDAR point from the center of the region of interest.

T. The non-transitory computer-readable medium as any one of paragraphs O-S recites, wherein generating the score for the LIDAR point comprises multiplying the probability density by the factor.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously, in reverse order, with additional operations, or omitting operations, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   receiving LIDAR data and image data associated with an environment;
   determining, based at least in part on the image data, a region of interest identifying a portion of the image data as being associated with an object in the environment;
   generating scores for LIDAR points associated with the region of interest, wherein generating a first score of the scores for a corresponding first LIDAR point is based, at least in part, on a distance from a first point in the image data within the region of interest to a second point in the image data associated with a projection of the first LIDAR point into the image data, and wherein the first score is non-binary;
   determining, based at least in part on the scores, a weighted median of the LIDAR points; and
   determining, based at least in part on the weighted median, a first depth estimate associated with a distance from a sensor to the object.

2. The method of claim 1, wherein generating the first score comprises determining, by a machine-learned model, a probability distribution associated with a depth measurement associated with the first LIDAR point.

3. The method of claim 2, wherein determining the probability distribution by the machine-learned model comprises:
   providing at least one of an object detection or a classification associated with the object detection as input to the machine-learned model; and receiving, from the machine-learned model, the probability distribution.

4. The method of claim 2, further comprising:
determining, based at least in part on the probability distribution, a probability density associated with the depth measurement associated with the first LIDAR point; and
determining, based at least in part on a distance between the first LIDAR point projected into the image data and a center of the region of interest, a factor.

5. The method of claim 4, wherein generating the first score associated with the first LIDAR point is based at least in part on the factor and the probability density.

6. The method of claim 1, further comprising controlling an autonomous vehicle based at least in part on the first depth estimate.

7. An apparatus comprising:
one or more processors; and
a memory storing processor-executable instructions that, when executed by the one or more processors, cause the apparatus to perform operations comprising:
receiving LIDAR data and image data associated with an environment;
receiving a region of interest identifying a portion of the image data as being associated with an object in the environment;
generating scores for LIDAR points associated with the region of interest, wherein generating a first score for a corresponding first LIDAR point is based at least in part on a distance from a first point within the region of interest to a second point in the image data associated with the first LIDAR point, and wherein the first score increases or decreases based at least in part on distance; and
determining, based at least in part on the scores, a first depth estimate associated with a distance from a sensor to the object.

8. The apparatus of claim 7, wherein generating the first score is based at least in part on:
providing at least one of an object detection or a classification associated with the object detection as input to a machine-learned model; and
receiving, from the machine-learned model, a probability distribution associating various depths with probabilities.

9. The apparatus of claim 8, wherein generating the first score is based at least in part on a probability density and a factor, the operations further comprising:
determining, based at least in part on the probability distribution, the probability density associated with a depth measurement associated with the first LIDAR point; and
determining, based at least in part on a distance between the first LIDAR point projected into the image data and a center of the region of interest, the factor.

10. The apparatus of claim 7, wherein determining the first depth estimate comprises:
sorting the LIDAR points by distance; and
determining, based at least in part on the sorted LIDAR points and the scores, a weighted median as the first depth estimate, wherein weights associated with the weighted median are based at least in part on the scores.

11. The apparatus of claim 7, wherein the operations further comprise:
identifying a subset of LIDAR points associated with distance values outside a range of depth values that are based at least in part on the first depth estimate;
sorting the subset of LIDAR points by distances associated with the subset of LIDAR points;
determining, based at least in part on scores associated with the subset and the sorting, a second weighted median; and
identifying, as a secondary depth estimate, a depth measurement associated with the second weighted median.

12. The apparatus of claim 11, wherein the operations further comprise identifying the secondary depth estimate as being associated with a second object in the environment.

13. The apparatus of claim 7, wherein the operations further generating instructions for controlling an autonomous vehicle based at least in part on the first depth estimate.

14. The apparatus of claim 7, wherein generating the first score comprises determining that a projection of the first LIDAR point is within the region of interest and determining the distance from the point within the region of interest to a projected point associated with the first LIDAR point.

15. A non-transitory computer-readable medium storing processor-executable instructions that, when executed by one or more processors, cause the one or more processors to perform operations comprising:
receiving LIDAR data and image data associated with an environment;
receiving a region of interest associated with an object in the environment;
generating scores for LIDAR points associated with the region of interest, wherein generating a first score for a corresponding first LIDAR point is based at least in part on a distance from a first point within the region of interest to a second point in the region of interest associated with the first LIDAR point, and wherein the first score increases or decreases based at least in part on distance; and
determining, based at least in part on the scores, a first depth estimate associated with a distance from a sensor to the object.

16. The non-transitory computer-readable medium of claim 15, wherein generating the first score is based at least in part on:
providing at least one of a portion of image data associated with the region of interest or a classification associated with the portion of image data as input to a machine-learned model; and
receiving, from the machine-learned model, a probability distribution identifying at least a probability associated with a particular depth.

17. The non-transitory computer-readable medium of claim 16, wherein generating the first score is based at least in part on a probability density and a factor, the operations further comprising:
determining, based at least in part on the probability distribution, the probability density associated with a depth measurement associated with the first LIDAR point; and
determining, based at least in part on a distance between the first LIDAR point projected into the image data and a center of the region of interest, the factor.

18. The non-transitory computer-readable medium of claim 15, wherein determining the first depth estimate comprises:
sorting the LIDAR points by distance; and
determining, based at least in part on the sorted LIDAR points and the scores, a weighted median as the first depth estimate, wherein weights associated with the weighted median are based at least in part on the scores.

19. The non-transitory computer-readable medium of claim 15, wherein the operations further comprise:
- identifying a subset of LIDAR points associated with distance values outside a range of depth values that are based at least in part on the first depth estimate;
- sorting the subset of LIDAR points by distances associated with the subset of LIDAR points;
- determining, based at least in part on scores associated with the subset and the sorting, a second weighted median; and
- identifying, as a secondary depth estimate, a depth measurement associated with the second weighted median.

20. The non-transitory computer-readable medium of claim 19, wherein the operations further comprise identifying the secondary depth estimate as being associated with a second object in the environment.

* * * * *